US006202478B1

(12) United States Patent
Blomquist et al.

(10) Patent No.: US 6,202,478 B1
(45) Date of Patent: Mar. 20, 2001

(54) EVAPORATIVE SYSTEM LEAK DETECTION FEATURE AFTER A REFUELING EVENT

(75) Inventors: William B. Blomquist, Lake Orion; Roland T. Richardson, Detroit; Gary D. Dawson, Rochester, all of MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/375,621

(22) Filed: Aug. 17, 1999

(51) Int. Cl.$^{7}$ .................................................. G01M 3/04

(52) U.S. Cl. .......................... 73/49.7; 73/40.5; 73/118.1; 701/31

(58) Field of Search .................................. 73/40, 40.5 R, 73/40.5 T, 49.7, 118.1, 115, 116; 701/31; 123/198 D, 520

(56) References Cited

U.S. PATENT DOCUMENTS

| | | | | |
|---|---|---|---|---|
| 5,263,462 | | 11/1993 | Reddy . | |
| 5,295,472 | | 3/1994 | Otsuka et al. . | |
| 5,461,569 | * | 10/1995 | Hara et al. | 73/118.1 |
| 5,495,749 | | 3/1996 | Dawson et al. . | |
| 5,560,243 | * | 10/1996 | Wild | 73/118.1 |
| 5,606,121 | | 2/1997 | Blomquist et al. . | |
| 5,616,836 | | 4/1997 | Blomquist et al. . | |
| 5,635,630 | | 6/1997 | Dawson et al. . | |
| 5,641,899 | | 6/1997 | Blomquist et al. . | |
| 5,651,350 | | 7/1997 | Blomquist et al. . | |
| 5,685,279 | | 11/1997 | Blomquist et al. . | |
| 5,715,799 | | 2/1998 | Blomquist et al. . | |
| 5,767,395 | * | 6/1998 | Goto et al. | 73/118.1 |
| 5,964,812 | * | 10/1999 | Schumacher et al. | 73/49.7 |
| 5,996,400 | * | 12/1999 | Nishioka et al. | 73/40.5 R |
| 6,044,314 | * | 3/2000 | Cook et al. | 73/49.7 |
| 6,053,151 | * | 4/2000 | Cook et al. | 123/520 |

* cited by examiner

*Primary Examiner*—Hezron Williams
*Assistant Examiner*—Michael Cygan
(74) *Attorney, Agent, or Firm*—Mark P. Calcaterra

(57) ABSTRACT

A method is provided for testing an evaporative emission control system for a missing or loose fuel cap comprising detecting a refueling event and running a leak detection test of the evaporative emission control system to determine if a large leak is present. If a large leak is detected, the methodology sets a fault code and activates a driver warning lamp indicating a potential cap sealing problem. The leak detection test is repeatedly re-executed after the large leak is detected to determine when the large leak condition ceases. When the large leak condition ceases, the previously set fault code is removed and the driver warning lamp is deactivated. If the large leak does not cease and is detected again after the next refueling event when an opportunity for resealing the cap existed, a new fault code is set indicating that the potential cap sealing problem is a persistent problem so that the integrity of the evaporative system may need to be tested. After setting the new fault code, fuel cap specific leak detection testing is suspended until the condition is serviced and the fault code is cleared or a normal leak detection test determines that there is no longer a problem. If no large leak is detected, the fuel cap is assumed to be properly sealed.

7 Claims, 5 Drawing Sheets

EVAPORATIVE SYSTEM LEAK DETECTION FEATURE AFTER A REFUELING EVENT

BACKGROUND OF THE INVENTION

1. Field of the Invention

The present invention relates generally to evaporative emission control systems for automotive vehicles and, more particularly, to a leak detection assembly and method for determining if a fuel cap sealing problem is present in an evaporative emission control system for an automotive vehicle.

2. Description of the Related Art

Modern automotive vehicles typically include a fuel tank and an evaporative emission control system that collects volatile fuel vapors generated in the fuel tank. The evaporative emission control system includes a vapor collection canister, usually containing an activated charcoal mixture, to collect and store volatile fuel vapors. Normally, the canister collects volatile fuel vapors which accumulate during refueling of the automotive vehicle or from increases in fuel temperature. The evaporative emission control system also includes a purge valve placed between an intake manifold of an engine of the automotive vehicle and the canister. The purge valve is opened by an engine control unit an amount determined by the engine control unit to purge the canister, i.e., the collected volatile fuel vapors are drawn into the intake manifold from the canister for ultimate combustion within a combustion chamber of the engine.

Recently, governmental regulations have required that certain automotive vehicles powered by volatile fuels such as gasoline have their evaporative emission control systems checked to determine if a leak exists in the system. As a result, on board vehicle diagnostic systems have been developed to determine if a leak is present in a portion of the evaporative emission control system. One such diagnostic system utilizes a vacuum regulator/sensor unit to draw a vacuum on the evaporative emission control system and sense whether a loss of vacuum occurs within a specified period of time.

Diagnostic systems also exist for determining the presence of a leak in an evaporative emission control system which utilizes positive pressurization rather than negative pressurization, i.e., vacuum. In positive pressurization systems, the evaporative emission control system is pressurized to a set pressure, typically through the use of an electric air pump. A sensor determines whether the pressure remains constant over a certain amount of time.

At times, a leak will exist in the system due to a fuel cap sealing problem. That is, the fuel cap is either missing, loose, or is not properly sized to the fuel tank fill tube. Present diagnostic systems do not specifically perform a test to identify this type of leak condition. As such, the sealing problem is not detected until operation of the standard diagnostic test. Further, conventional diagnostic systems treat such a leak condition the same as other types of leaks thereby activating the warning signals and/or setting fault codes. Such warning signals and fault codes are typically not cleared until after three cold starts, i.e., three days. As such, vehicle operators are taking their vehicles to dealerships for repair when a simple check and resealing of the fuel cap may resolve the situation.

In view of the foregoing, it would be desirable to provide a leak detection system for specifically determining if a fuel cap sealing problem is present in the evaporative emission control system of the automotive vehicle and informing the operator or service technician of the same.

SUMMARY OF THE INVENTION

It is, therefore, one object of the present invention to provide a leak detection system for use in testing the integrity of an evaporative emission control system for an automotive vehicle.

It is another object of the present invention to provide a leak detection system for use in testing the integrity of the fuel cap sealing in an evaporative emission control system after each refueling event.

It is yet another object of the present invention to provide a leak detection system for notifying the vehicle operator and/or service technician of a potential fuel cap sealing problem.

To achieve the foregoing objects, the present invention is a method of testing an evaporative emission control system for a missing or loose fuel cap comprising detecting a refueling event and running a leak detection test of the evaporative emission control system to determine if a large leak is present. If a large leak is detected, the methodology sets a fault code and activates a driver warning lamp indicating a potential cap sealing problem. The leak detection test is repeatedly re-executed after the large leak is detected to determine when the large leak condition ceases. When the large leak condition ceases, the previously set fault code is removed and the driver warning lamp is deactivated. If the large leak continues to be detected and is then detected again after the next refueling event (when an opportunity for resealing the cap existed), a new fault code is set indicating that the potential cap sealing problem is a persistent problem so that the integrity of the evaporative system may need to be tested. After setting the new fault code, fuel cap specific leak detection testing is suspended until the condition is serviced and the fault code is cleared or the standard leak detection test determines that the leak has been corrected. When no large leak is detected, the fuel cap is assumed to be properly sealed.

One advantage of the present invention is that a leak detection system is provided for an evaporative emission control system of an automotive vehicle. Another advantage of the present invention is that a potential fuel cap sealing problem is quickly identified after each refueling event. Yet another advantage of the present invention is that the potential fuel cap sealing problem is identified separately from other non-cap related leak conditions. Still yet another advantage of the present invention is that the indicator lamp and fault codes are immediately removed after the fuel cap sealing problem condition is corrected.

Other objects, features, and advantages of the present invention will be readily appreciated as the same becomes better understood after reading the subsequent description taken in conjunction with the accompanying drawings.

DESCRIPTION OF THE PREFERRED EMBODIMENTS

Figure 1:
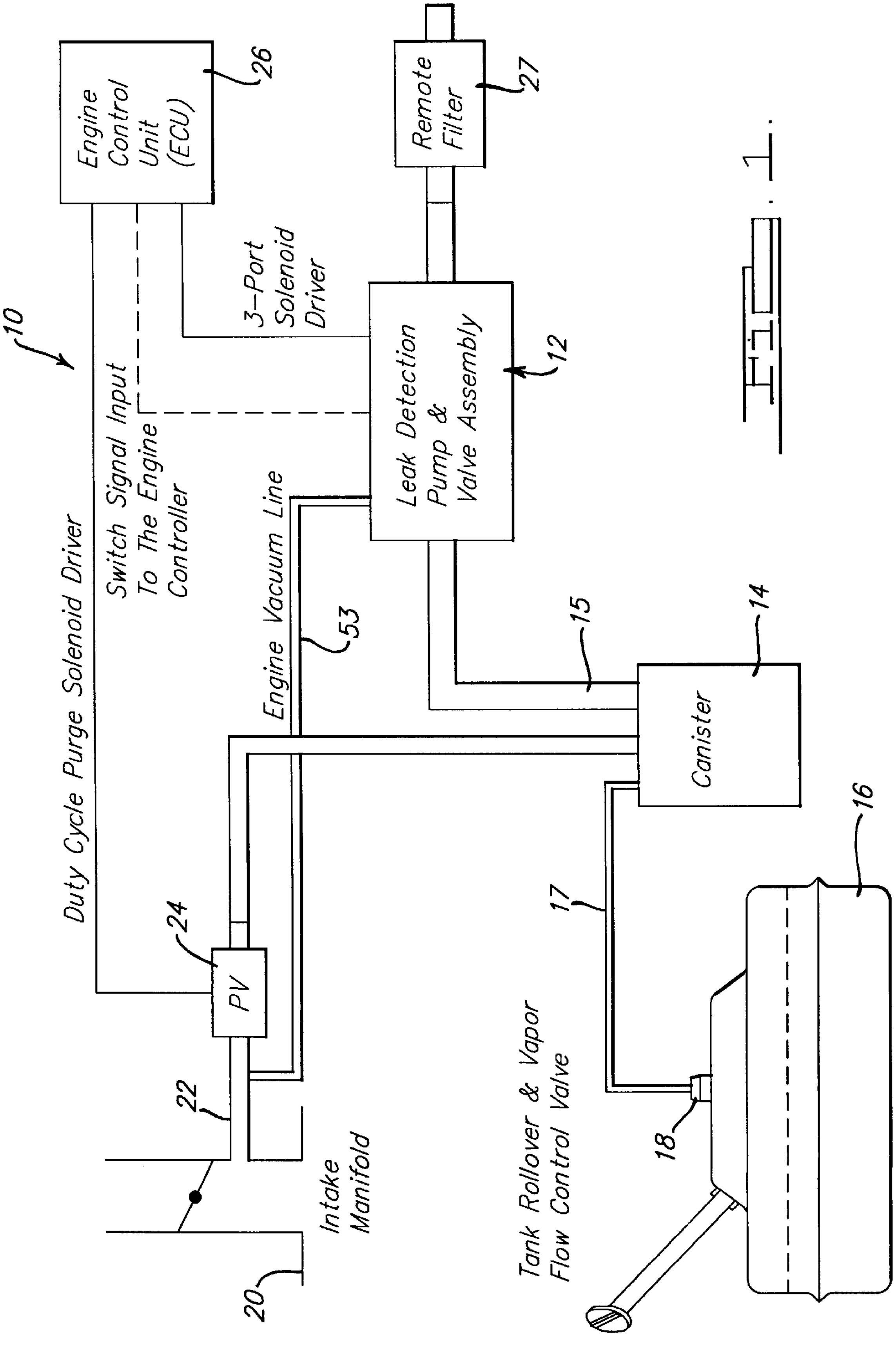
FIG. 1 is a schematic diagram of an evaporative emission control system according to the present invention.

Referring to FIG. 1, an evaporative emission control system 10 is shown for an automotive vehicle (not shown)

including a leak detection pump and valve assembly, generally indicated at 12. The control system 10 also includes a carbon canister 14 connected by a conduit 15 to the leak detection pump and valve assembly 12. A fuel tank 16 is connected to the carbon canister 14 by a tank rollover and vapor flow control valve 18 and a conduit 17. This is a representative example of several possible means by which the fuel tank 16 is connected to the carbon canister 14.

An intake manifold 20 is connected to the carbon canister 14 by a conduit 22. The control system 10 includes a purge valve 24 mounted on the conduit 22. The control system 10 also includes an engine control unit 26 connected to and operative to control the leak detection pump and valve assembly 12 and the purge valve 24. The control system 10 includes a remote filter 27 connected to the leak detection pump and valve assembly 12 and atmosphere.

In operation, a supply of volatile liquid fuel for powering an engine (not shown) of the automotive vehicle is placed in the fuel tank 16. As fuel is pumped into the fuel tank 16 or as the temperature of the fuel increases, vapors from the fuel pass through the conduit 19 and are received in the canister 14. The purge valve 24 is normally closed. Under certain vehicle operating conditions conducive to purging, the engine control unit 26 operates the purge valve 24 such that a certain amount of engine intake vacuum is delivered to the canister 14 causing the collected vapors to flow from the canister 14 through the conduit 22 and the purge valve 24 to the intake manifold 20 for combustion in the combustion chambers.

Figure 2:
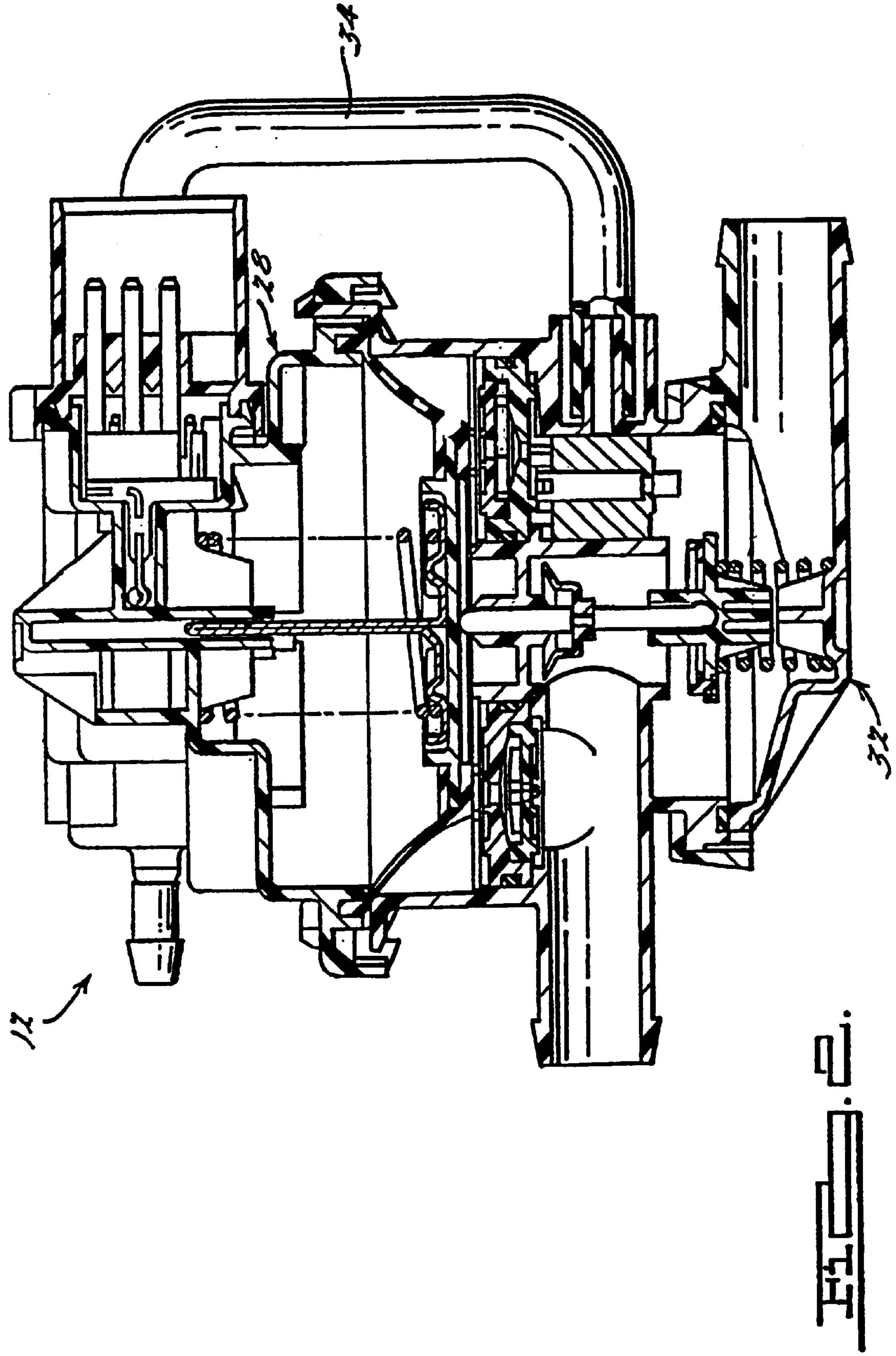
FIG. 2 is a cross-sectional view of a leak detection pump and valve assembly of the evaporative emission control system of FIG. 1.

Referring to FIG. 2, the leak detection pump and valve assembly 12 includes a vacuum actuated leak detection pump, generally indicated at 28, and a mechanically actuated canister vent control valve, generally indicated at 32. An atmospheric vent hose 34 interconnects the leak detection pump 28 and atmosphere. It should be appreciated that the vent control valve 32 seals or closes the conduit 15 between the carbon canister 14 and an atmospheric vent in order to positively pressurize the evaporative emission control system 10.

In accordance with the present invention, the leak detection pump and valve assembly 12 is used to perform a test of the integrity of the evaporative emission control system 10. To conduct the test, the engine control unit 26 closes the purge valve 24 and actuates the leak detection pump 28. The vent control valve 32 is mechanically actuated such that a vacuum drawn to activate the leak detection pump 28, results in a corresponding mechanical motion which causes the vent control valve 32 to close and seal the canister 14 from the atmospheric vent and remote filter 27 (FIG. 1). Once the conduit 15 is sealed off, the leak detection pump 28 then positively pressurizes the evaporative emission control system 10 and fuel tank 16 to a predetermined pressure. Once the predetermined pressure is assumed to have been reached, the leak detection pump 28 enters a diagnostic mode to be described. If the control system 10 has a leak, the pressure is reduced and the leak detection pump 28 will sense the reduced pressure and will actuate. The leak detection pump 28 will continue to pump at a rate which will be representative of the flow characteristic as related to the size of the leak. From this information, it can be determined if the leak is larger or smaller than the required detection limit, e.g., a large leak as caused by a missing or loose fuel cap or a small leak as set by applicable governmental standards.

Figure 3A:
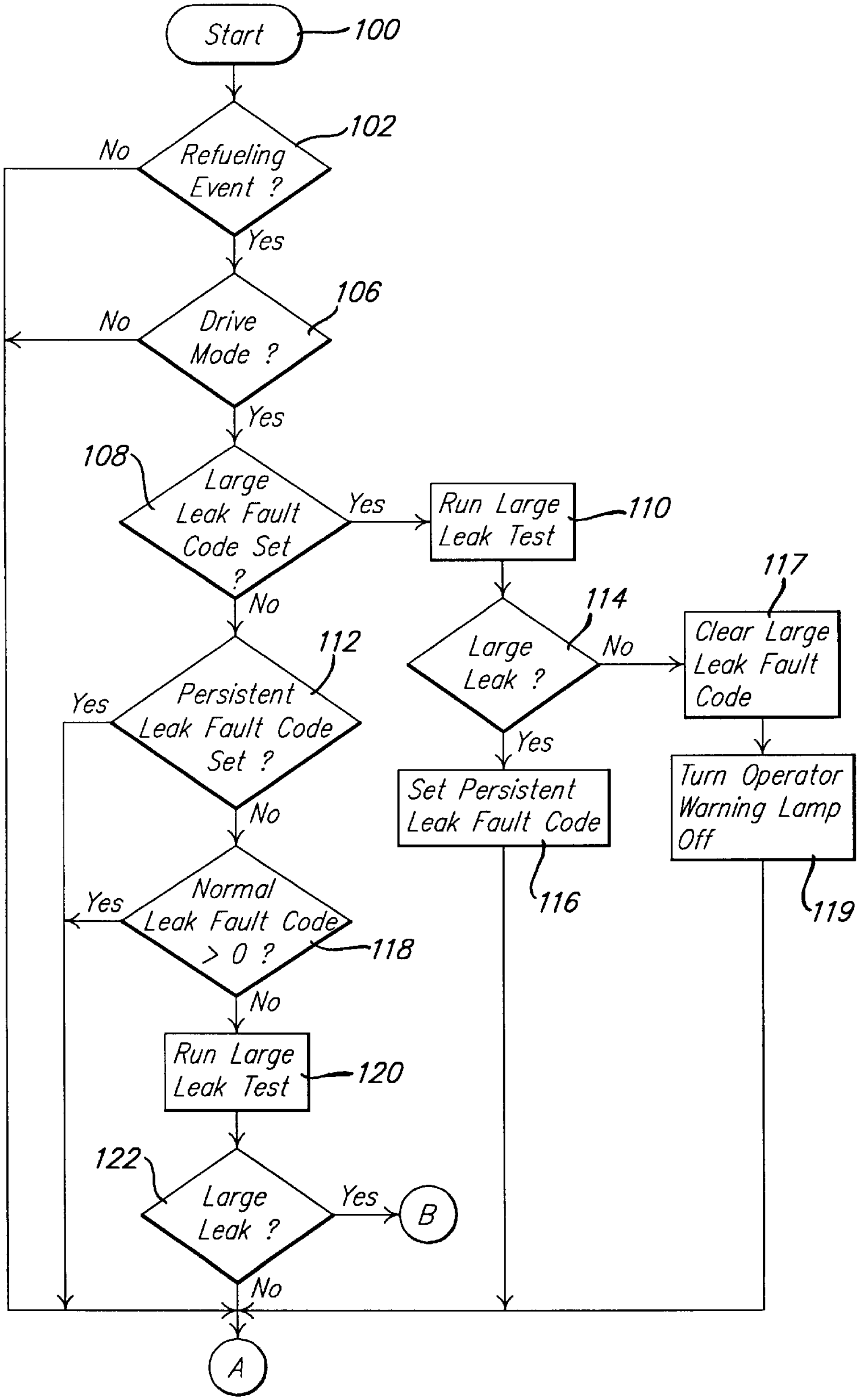
FIGS. 3A and 3B are a flow chart of a method of leak detection according to the present invention for the evaporative emission control system of FIG. 1.
Figure 3B:
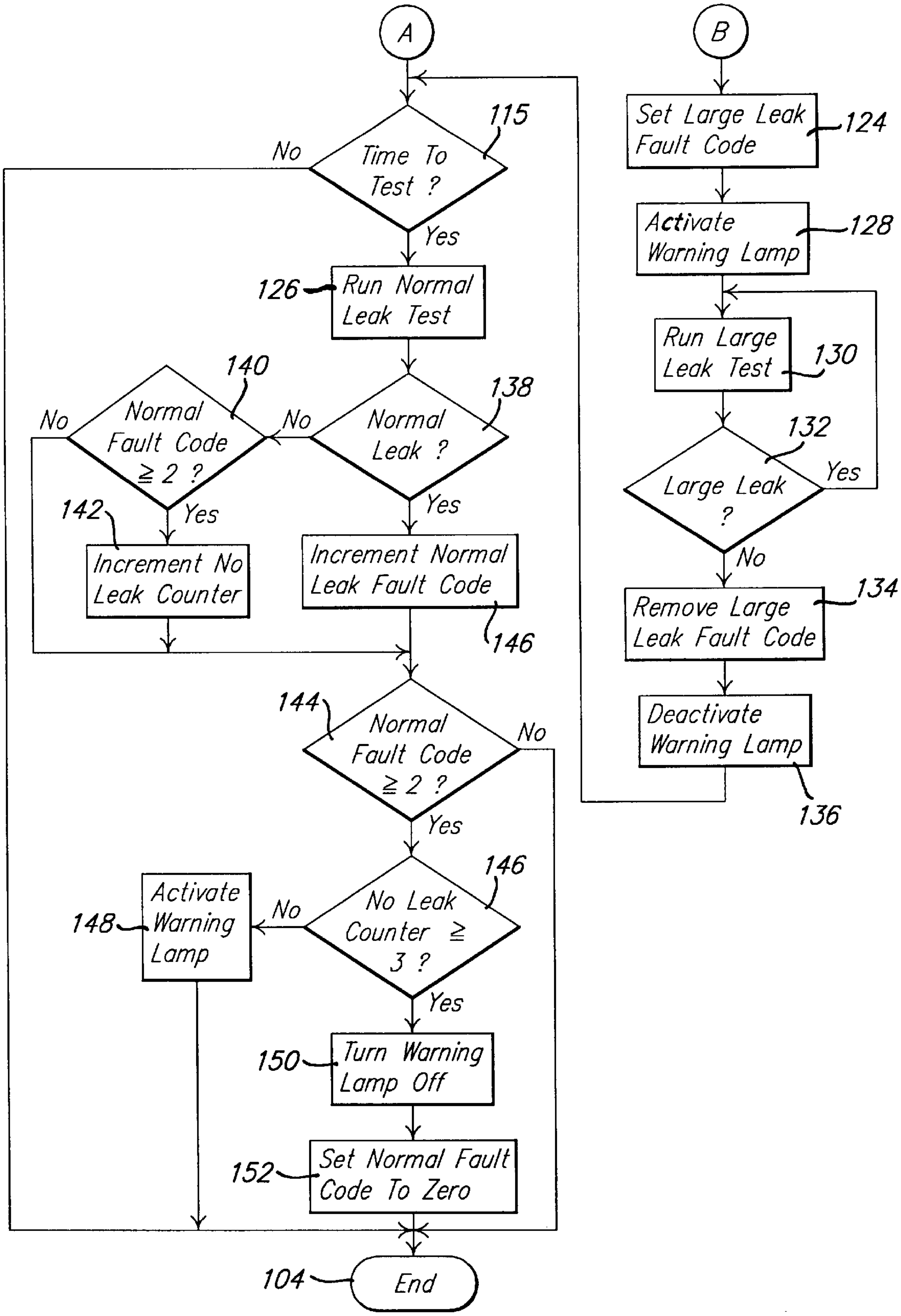

Referring to FIGS. 3A–3B, a method of detecting a leak according to the present invention in the evaporative emission control system 10 is illustrated. While a brief description of the large leak test and normal leak test are described herein, it should be appreciated that both tests are conducted in essentially the same manner as described with the large leak test only detecting leaks possibly attributable to a loose or missing fuel cap and the normal leak test looking for large or small leaks down to those limits set by applicable governmental standards. A more thorough description of the diagnostic test utilizing the present invention can be found in U.S. Pat. No. 5,606,121 entitled METHOD OF TESTING AN EVAPORATIVE EMISSION CONTROL SYSTEM to Blomquist, et al. and assigned to the assignee of the present invention which is hereby expressly incorporated by reference herein.

The methodology begins in bubble 100 to perform tasks that are common to each periodic execution of the routine. To perform the common tasks, the methodology advances to diamond 102. In diamond 102 the methodology determines whether the vehicle has just experienced a refueling event, for example, by looking for an indicator such as a flag. The flag would be set when a large increase of fuel is detected in the fuel tank. If a refueling event has just occurred at diamond 102, the methodology advances to diamond 106. However, if no refueling event has just occurred at diamond 102, the methodology advances through connector A to diamond 115 to determine if it is time to run a normal leak test.

In diamond 106, the methodology determines if the vehicle is in the appropriate drive mode for large leak testing, for example, by looking for an indicator such as a flag. For instance, for vehicles including an automatic transmission, the flag would be set each time the transmission is transitioned from neutral or park into drive. For vehicles equipped with a manual transmission, the flag would be set each time the vehicle speed changes from zero. If the vehicle is not in the appropriate drive mode at diamond 106, the methodology advances through connector A to diamond 115. However, if the vehicle is in the appropriate drive mode at diamond 106, the methodology advances to diamond 108.

In diamond 108, the methodology determines if a large leak fault code is set, for example, by looking for an indicator such as a flag. For instance, the large leak fault code flag would be set if the last execution of the routine prior to the last refueling event resulted in a large leak being detected. The large leak fault code is indicative of a short term correctable fault which could easily be corrected. If the large leak fault code is set at diamond 108, the methodology advances to block 110. However, if the large leak fault code is not set at diamond 108, the methodology advances to diamond 112. As can be appreciated from the description of decision block 102, the large leak test of block 110 is only conducted one time after each transition form park or neutral to drive in vehicles equipped with automatic transmissions, or after each change in speed from zero in vehicles with manual transmissions, if the large leak fault code is set at decision block 108.

In block 110, the methodology runs a large leak test to determine the integrity of the evaporative emission control system 10 as described above. The size of the leak tolerance for the large leak test is set according to a leak which could be attributable to a fuel cap sealing problem, such as a missing or loose fuel cap rather than by applicable governmental standards. In other words, the large leak test does not test the system for compliance with governmental standards by looking for small leaks but rather only tests for large leaks possibly attributable to a fuel cap sealing problem. It should be noted that no new execution of the routine is started if a test is already under way. Also, testing is conducted regardless of temperature gates or other factors normally used to limit testing. Further, the vehicle's purge system is disabled during the large leak test. If a large leak is detected, the methodology assumes that the leak is due to an open fill tube. Thereafter, an assumption is made that vapor generation and other issues that could cloud the data from the leak detection pump are not present.

From block 110, the methodology advances to diamond 114. In diamond 114, the methodology determines whether a large leak was detected by the large leak test at block 110. If so, the methodology advances to block 116 and sets a persistent leak fault code. The persistent leak fault code indicates that after two consecutive refueling events, a large leak was detected presumably indicating that the fuel cap was missing or loose, and that an opportunity to correct the problem was afforded, but the problem was not corrected, i.e., the driver could have put the fuel cap back on after the second refueling event. When downloaded, the persistent leak fault code indicates to a service technician that the evaporative emission control system problem may be related to a persistent fuel cap sealing problem. As such, the service technician will know to carefully check the fuel cap for damage, proper make/style, and/or can advise the vehicle operator of the need to carefully reseal the fuel cap. From block 116, the methodology advances through connector A to diamond 115. However, if no large leak is detected by the large leak test at decision block 114, the methodology advances to block 117. In block 117, the methodology clears the previously set large leak fault code. From block 117, the methodology advances to block 119. In block 119, the methodology extinguishes any operator warning lamp that may have been lit in conjunction with the large leak fault code. From block 119, the methodology advances through connector A to diamond 115.

Referring again to diamond 108, if the large leak fault code is not set, the methodology advances to diamond 112. In diamond 112, the methodology determines whether the persistent leak fault code is set, for example, by looking for an indicator such as a flag. If the persistent leak fault code is set at diamond 112, the methodology advances through connector A to diamond 115. However, if the persistent leak fault code is not set at diamond 112, the methodology advances to diamond 118.

In diamond 118, the methodology determines if a normal leak fault code counter is greater than zero. As described in greater detail below, if a standard leak test indicates that a leak is present in the evaporative emission control system 10, the fuel cap leak specific testing (i.e., the large leak test) is suspended. Therefore, if the normal leak fault code counter is greater than zero at diamond 118, the methodology advances through connector A to diamond 115. However, if the normal leak fault code counter is not greater than zero at diamond 118, the methodology advances to block 120.

In block 120, the methodology runs the large leak test to determine if a potential fuel cap sealing problem exists as described above. From block 120, the methodology advances to diamond 122 to determine if a large leak was detected. If a large leak is detected by the large leak test, the methodology advances from diamond 122 through connector B to block 124. However, if no large leak is detected at diamond 122, the methodology advances through connector A to diamond 115.

In block 124, the methodology sets the large leak fault code which will, when downloaded, indicate to a service technician that the evaporative emission control system problem may be fuel cap sealing related. As such, the technician will know to carefully inspect the fuel cap for a missing or loose condition. After setting the large leak fault code at block 124, the methodology advances to block 128 and activates a warning lamp to apprise the vehicle operator of a potential problem with fuel cap sealing. That is, the indicator lamp will apprise the operator that the fuel cap may have been left off or misaligned.

From block 128, the methodology advances to block 130. In block 130, the methodology reruns the large leak test as described above to determine when the fuel cap problem is corrected. From block 130, the methodology advances to diamond 132 where the methodology determines whether the large leak was re-detected by the large leak test. If the large leak continues to be detected at diamond 132, the methodology advances to bubble 104 and exits the subroutine pending another drive mode transition at diamond 102. However, if no large leak is detected at diamond 132, the methodology advances to block 134. It should be noted, however, that if the length at which the leak detection pump 28 pumps (i.e., the pump period) indicates that the flow characteristics of the leak represent a smaller leak than that normally attributable to a missing or loose fuel cap, no large leak is present and therefore the large leak fault code is removed and the warning lamp is extinguished. Also, the loop between diamond 132 and block 130 is interrupted at the next refueling event even if the leak continues to be detected. Thereafter, the methodology follows the sequence as described above with respect to diamond 106 et seq.

In block 134, the methodology removes the large leak fault code since the problem has been corrected. From block 134, the methodology advances to block 136 and deactivates the warning lamp. From block 136, the methodology advances to diamond 115.

Referring again to diamond 122, if no large leak is detected by the initial large leak test (block 120), the methodology advances through connector A to diamond 115. As such, the normal leak test is only run during a drive cycle in which the large leak test eventually indicates that no large leak is present. In diamond 115, the methodology determines if it is time to run the normal leak test. If so, the methodology advances to block 126. However, if it is not time to run the normal leak test, the methodology advances to bubble 104 and exits the routine.

In block 126, the methodology runs the normal leak test as described above. In this test, not only are large leaks detected, but small leaks down to the limits set by applicable government standards are also detected. From block 126, the methodology advances to diamond 138. In diamond 138 the methodology determines if a leak was detected by the normal leak test.

If no leak is detected at diamond 138, the methodology advances to diamond 140. In diamond 140, the methodology determines if the normal leak fault code is greater than or equal to two. If so, the methodology advances to block 142 and increments a no leak counter. However, if the normal leak fault code is less than two at diamond 140, the methodology advances to diamond 144. Similarly, after incrementing the no leak counter at block 142, the methodology advances to diamond 144.

Referring again to diamond 138, if a leak is detected in the system by the normal leak test, the methodology advances to block 146 and increments the normal leak fault code. From block 146, the methodology advances to diamond 144. In diamond 144, the methodology determines if the normal leak fault code is greater than or equal to two. If not, the methodology advances to bubble 104 and exits the routine.

However, if the normal leak fault code is greater than or equal to two, the methodology advances to diamond 146. In diamond 146, the methodology determines if the no leak counter is greater than or equal to three. If not, the methodology advances to block 148. In block 148, the methodology activates the operator warning light to indicate that there is a leak in the system. From block 148, the methodology advances to bubble 104 and exits the routine.

Referring again to diamond 146, if the no leak counter is greater than or equal to three, the methodology advances to block 150. In block 150, the methodology extinguishes the operator warning lamp. From block 150 the methodology advances to block 152. In block 152, the methodology sets the normal leak fault code to zero. As such, the normal leak fault code is removed and the operator warning lamp is extinguished after being set by the normal leak test only after three consecutive normal leak tests indicate that no leak is present. From block 152, the methodology advances to bubble 104 and exits the routine.

Figure 4:
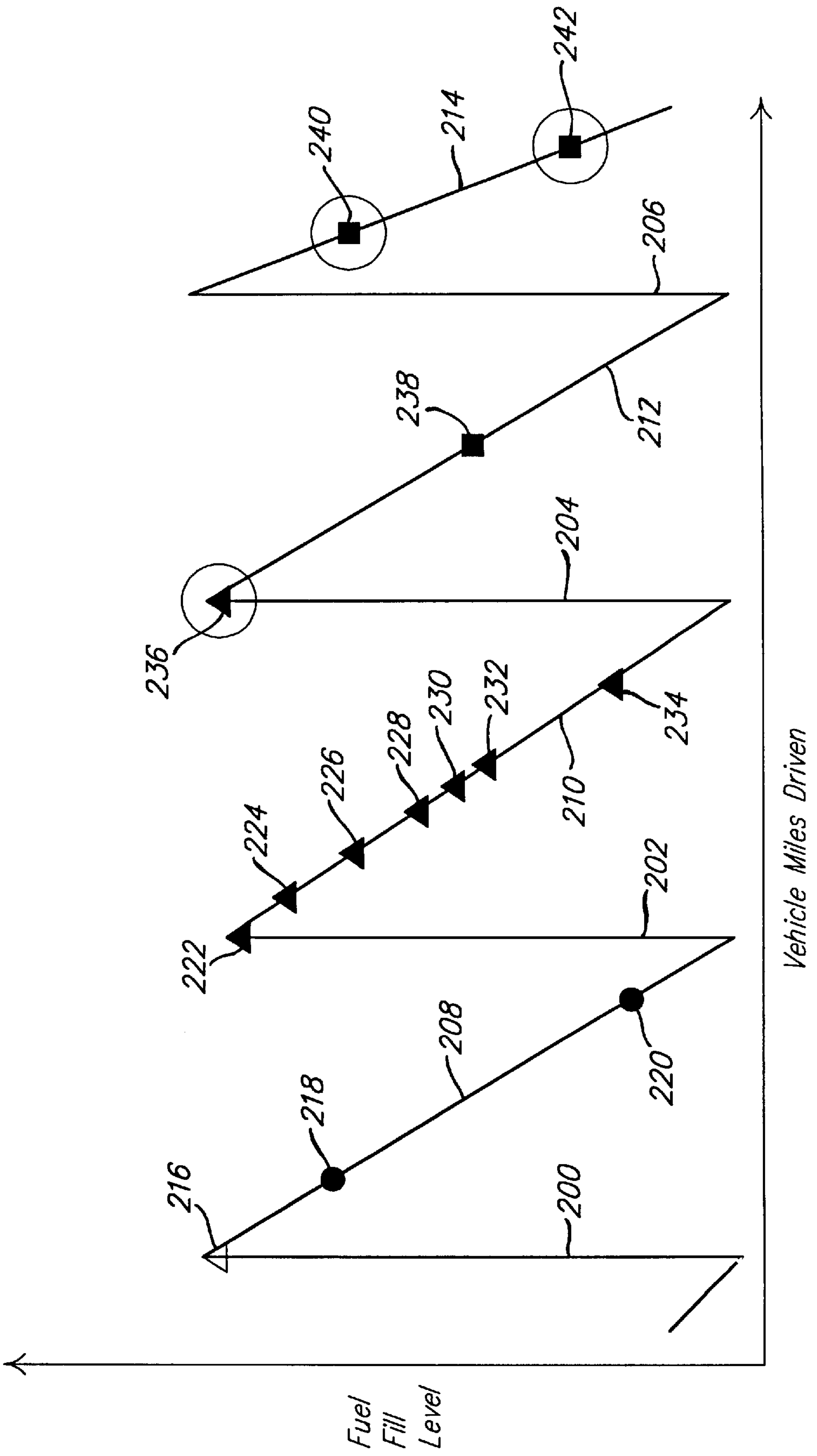
FIG. 4 is a graphic illustration of a series of refueling events depicting the periodic execution of the method of the present invention.

Referring now to FIG. 4, a graphic depiction of a series of refueling events and a representative sample of the testing according to the present invention is illustrated. Subsequent refueling events are represented by the vertical lines 200–206 and subsequent depletion of the fuel in the fuel tank is represented by angled lines 208–214. The hollow triangle represents a large leak test where no large leak is detected, the solid circle represents a normal leak cold start test where no leak is detected, the solid triangles represent a large leak test where a large leak is detected and the solid squares represent the normal cold start leak test where a large or small leak is detected.

Thus, reading the graph from left to right, after the refueling event 200, the large leak test is conducted at 216 which indicates that no large leak was detected. The assumption is that the fuel cap has been properly replaced. Shortly thereafter at 218, the methodology conducts the normal leak test. This test also indicates that no leaks are present in the system. Thereafter at 220, the normal leak test is run again and again detects no leaks.

After the next refueling event 202, the large leak test is run at 222 and detects a large leak. The assumption is that the fuel cap is not properly sealed. Accordingly, the large leak fault code is set and the operator warning lamp is lit. From 224 through 234, the large leak test is repeatedly run in an attempt to immediately identify when the fuel cap problem is corrected. After the next refueling event 204, the large leak test is run once again at 236. If a large leak is again detected, a persistent leak fault code is set indicating that the vehicle operator had an opportunity to fix the potential fuel cap sealing problem but did not. If no leak is detected at 236, the large leak fault code is cleared and the operator warning lamp is extinguished.

For the purposes of this discussion, it will now be assumed that a large leak was detected at 236. Thus, the persistent leak fault code is set and the large leak test is suspended. At 238, the methodology performs a normal leak cold start test which again detects a leak in the system but also notes that the fuel cap is not the problem since there has been ample opportunity for the fuel cap to be corrected. The methodology then sets the normal leak fault code counter to one. After the refueling event 206, the large leak test is not run since the normal leak fault code equals one. At 240 and 242, the normal leak test indicates that a leak is still present. As such, the normal leak fault code counter is incremented and the operator warning lamp remains lit. Thus, at 238–242, the normal leak test continues to confirm that the leak is present. On the other hand, should the normal leak test at each of 238, 240 and 242 indicate that no leak is present, the normal leak fault code is decremented to zero and the operator warning lamp is extinguished. Thus, the normal leak fault code is removed and the operator warning lamp is extinguished after three consecutive normal leak tests indicate that no leak is present.

Thus, the present invention provides a means for specifically detecting a leak in an evaporative emission control system attributable to a potential fuel cap sealing problem. The methodology does not need to wait until a normal leak detection test is executed for determining the potential fuel cap sealing problem after a refueling event. Further, a diagnostic fault code is set and a warning lamp is lit indicating to a service technician and/or vehicle operator that the leak in the system is possibly due to a loose or missing fuel cap. As soon as the large leak condition is corrected, the fault code is cleared and the warning lamp is extinguished.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A method of testing an evaporative emission control system for a fuel cap sealing problem comprising:

detecting a refueling event;

running a large leak test of said system to determine if a large leak is present;

setting a large leak fault code and activating a driver warning lamp indicating a potential cap sealing problem if said large leak is detected;

rerunning said large leak test repeatedly after said large leak is detected to determine when said large leak condition ceases;

removing said large leak fault code and deactivating said driver warning lamp when said large leak condition ceases;

detecting a next refueling event after said large leak is detected if said large leak condition has not ceased;

rerunning said large leak test after said next refueling event;

setting a persistent leak fault code indicating that said potential cap sealing problem had an opportunity to be corrected but was not if said large leak is again detected;

suspending subsequent large leak tests until said persistent leak fault code is cleared; and suspending said large leak test from running after two consecutive normal leak tests indicate a leak is present in said system.

2. The method of claim 1 wherein said large leak test is run for an automatic transmission vehicle when said vehicle is in drive.

3. The method of claim 1 wherein said large leak test is run for a manual transmission vehicle when said vehicle changes speed from zero.

4. The method of claim 1 further comprising running a normal leak test to check said system for any leak if said large leak test does not detect said large leak.

5. The method of claim 1 further comprising suspending a running of a normal leak test to check said system for any leak if said large leak test detects said large leak.

6. The method of claim 1 further comprising disabling a purge system while said large leak test is running.

7. A method of testing an evaporative emission control system for a fuel cap sealing problem comprising:

detecting a refueling event;

running a large leak test of said system to determine if a large leak is present;

setting a large leak fault code, activating a driver warning lamp indicating a potential cap sealing problem, and suspending all normal leak tests to check said system for any leaks if said large leak is detected;

rerunning said large leak test repeatedly after said large leak is detected to determine if said large leak condition ceases and removing said large leak fault code and deactivating said driver warning lamp when said large leak condition ceases;

running said normal leak tests to check said system for any leaks if said large leak is not detected;

suspending further large leak tests from running if two consecutive normal leak tests detect a leak in said system;

detecting a next refueling event after said large leak is detected if said large leak condition has not ceased;

rerunning said large leak test after said next refueling event;

setting a persistent leak fault code indicating that said potential cap sealing problem had an opportunity to be corrected but was not if said large leak is again detected; and suspending subsequent large leak tests until said persistent leak fault code is cleared.

* * * * *